N. D. RICE.
HEADLIGHT CONTROLLING MECHANISM.
APPLICATION FILED JAN. 14, 1918. RENEWED FEB. 17, 1920.
1,337,849. Patented Apr. 20, 1920.
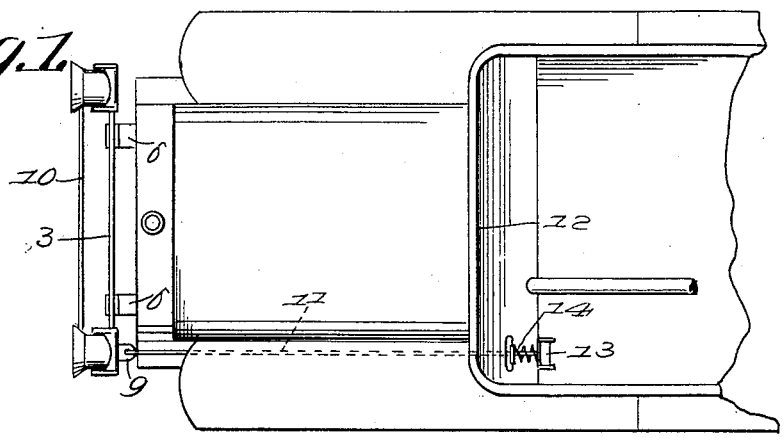
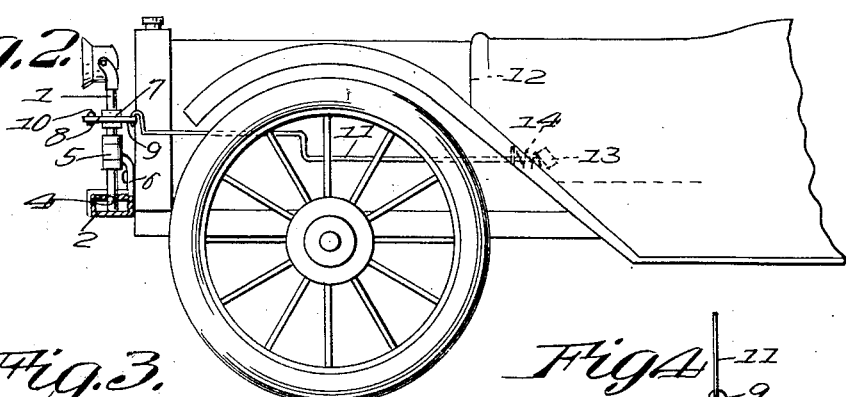
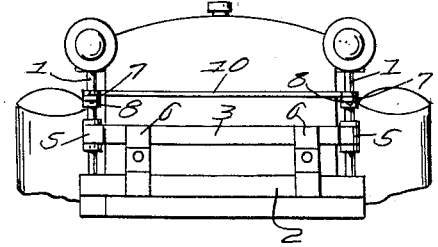
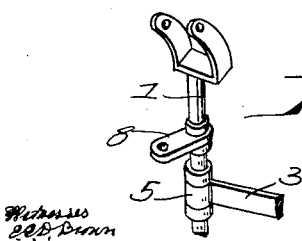
Inventor
Nelson D. Rice,
By Chandler & Chandler
Attorneys

UNITED STATES PATENT OFFICE.

NELSON D. RICE, OF YANKEE, NEW MEXICO.

HEADLIGHT-CONTROLLING MECHANISM.

1,337,849.  Specification of Letters Patent.  Patented Apr. 20, 1920.

Application filed January 14, 1918, Serial No. 211,789. Renewed February 17, 1920. Serial No. 359,315.

*To all whom it may concern:*

Be it known that I, NELSON D. RICE, a citizen of the United States, residing at Yankee, in the county of Colfax, State of New Mexico, have invented certain new and useful Improvements in Headlight-Controlling Mechanism; and I do hereby declare the following to be a full, clear, and exact description of the invention, such as will enable others skilled in the art to which it appertains, to make and use the same.

This invention relates to automobile headlights.

The object of the invention is to provide a mounting for automobile headlights by means of which the direction of the latter may be controlled by the driver by a dashboard mechanism.

A further object of the invention is to provide such a control mechanism which may be operated to turn the lights in either direction by means of a common operating device, the direction of change depending upon the particular manner in which the pressure is applied to the operating device. Thus, I have mounted the headlights upon rotatable standards and have connected thereto an operating rod which extends through the dashboard and is there provided with a foot pedal. The rod is spring retracted so as to hold the lamps in normally straight-ahead direction, but may also be rocked slightly in a lateral direction so that, depending upon which side of the pedal the foot pressure is applied, the lamps will be swung in one direction or the other in accordance with the driver's desires.

With the above objects in view, and such others relating to the details of construction, as may hereinafter appear, my invention will now be fully set forth and described, reference being had to the accompanying drawings.

In the drawings:—

Figure 1 is a plan view showing the arrangement of the parts,

Fig. 2 is a side elevation,

Fig. 3 is a front view,

Fig. 4 is a horizontal section,

Fig. 5 is a detail perspective view and,

Fig. 6 is another detail perspective view.

Referring more particularly to the drawings, 1 represents each one of a pair of lamp standards which have their bearings in a transverse supporting bar 2 and an upper brace bar 3. The bar 2 is preferably a tubular structure through whose upper side are formed the openings 4 within which the feet of the standards 1 project so that their extremities rest upon the lower side of the bar 2. The brace bar 3 is provided at its extremities with the inclosed bearings 5 above and below which threaded collars surrounding the standards 1 are adjustably positioned to prevent any vertical movement of the standards within their bearings. The bar 2 and the brace bar 3 are connected in a unitary frame by means of the vertical plates 6, which constitute brackets by means of which the device may be attached to the front of any automobile.

Also fixed upon each of the standards 1 is a collar 7. One of the collars 7 has a forwardly projecting arm 8, while the other in addition to a forwardly projecting arm 8 also has a rearwardly projecting arm 9, extending in diametrically opposite direction from the arm 8. The free extremities of the arms 8 are connected by means of a connecting rod or bar 10, such that when one of the standards is swung the other will be swung therewith in a corresponding direction. Extending rearwardly from the end of the arm 9 to which it is pivotally connected, and in direct line with the arms 8 and 9, is an operating rod 11. Said rod 11 extends through the dashboard 12, and carries upon its rear end a transversely elongated foot pedal 13. A coil spring 14 surrounding the rod 11 and bearing between the foot pedal 13 and the dashboard 12, normally throwing the rod to the rear and straightening the arms 8 and 9 and the rod 11 into alinement. The rod 11 has a bearing in the dashboard 12 which is slightly elongated in a lateral direction, so that the rod 11 has a limited amount of free play. This limited amount of free play is just sufficient to avoid the dead center of the connection between the arm 9 and the rod 11, so that, depending upon the direction in which the rod is shifted, pressure upon the foot pedal will cause the standards to be rotated in one direction or the other. Thus, if the pressure is applied to push the foot pedal 13 to the right, the longitudinal movement of the foot pressure applied to the rod will throw the point of the pivotal connection between the rod 11 and the arm 9 to the left, so that the lamps will be rotated to the right. To swing the lamps to the left, the reverse operation is carried out.

It will be apparent from the foregoing description that I have provided a very practical headlight controlling mechanism which is adaptable for installation on any automobile now in use.

What I claim as my invention is:—

A headlight or control mechanism including a rotatable lamp standard, an operating rod adapted to be supported in the dash of a vehicle for swinging movement laterally in a horizontal plane to overcome dead center and having connection with the standard for moving the same, a foot pedal on the free end of the operating rod, and a coiled expansion spring working between the dash and the foot pedal for automatically moving the rod rearwardly and bringing the lamp standard to normal position after shifting thereof.

In testimony whereof I affix my signature in the presence of two witnesses.

NELSON D. RICE.

Witnesses:
 Foss B. Smith,
 Joseph H. Cenul.